May 30, 1939. J. VAN VULPEN 2,160,689
SUPPORT FOR RADIATING PIPES
Filed March 31, 1938 3 Sheets-Sheet 1
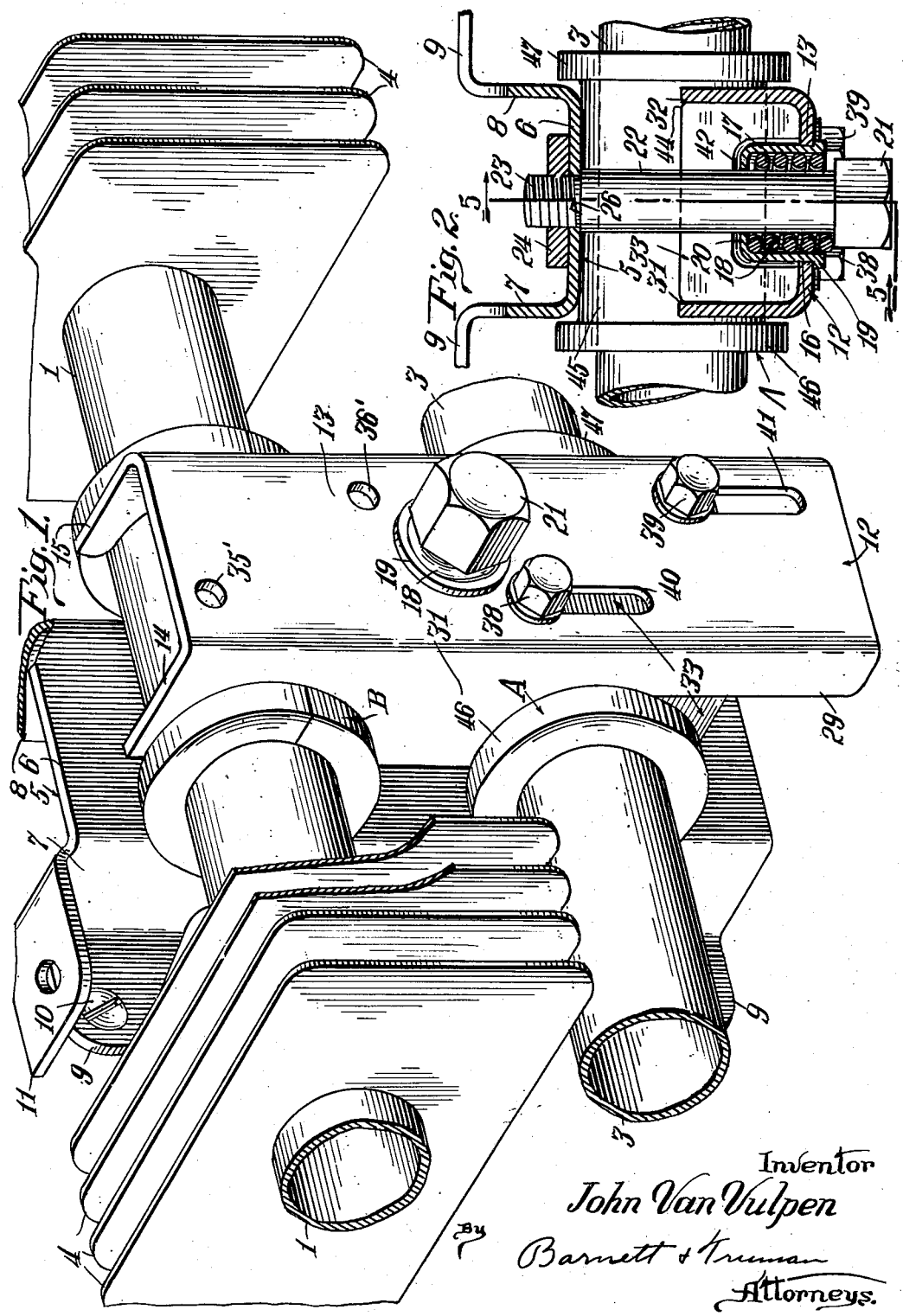
Inventor
John Van Vulpen
By Barnett & Truman
Attorneys.

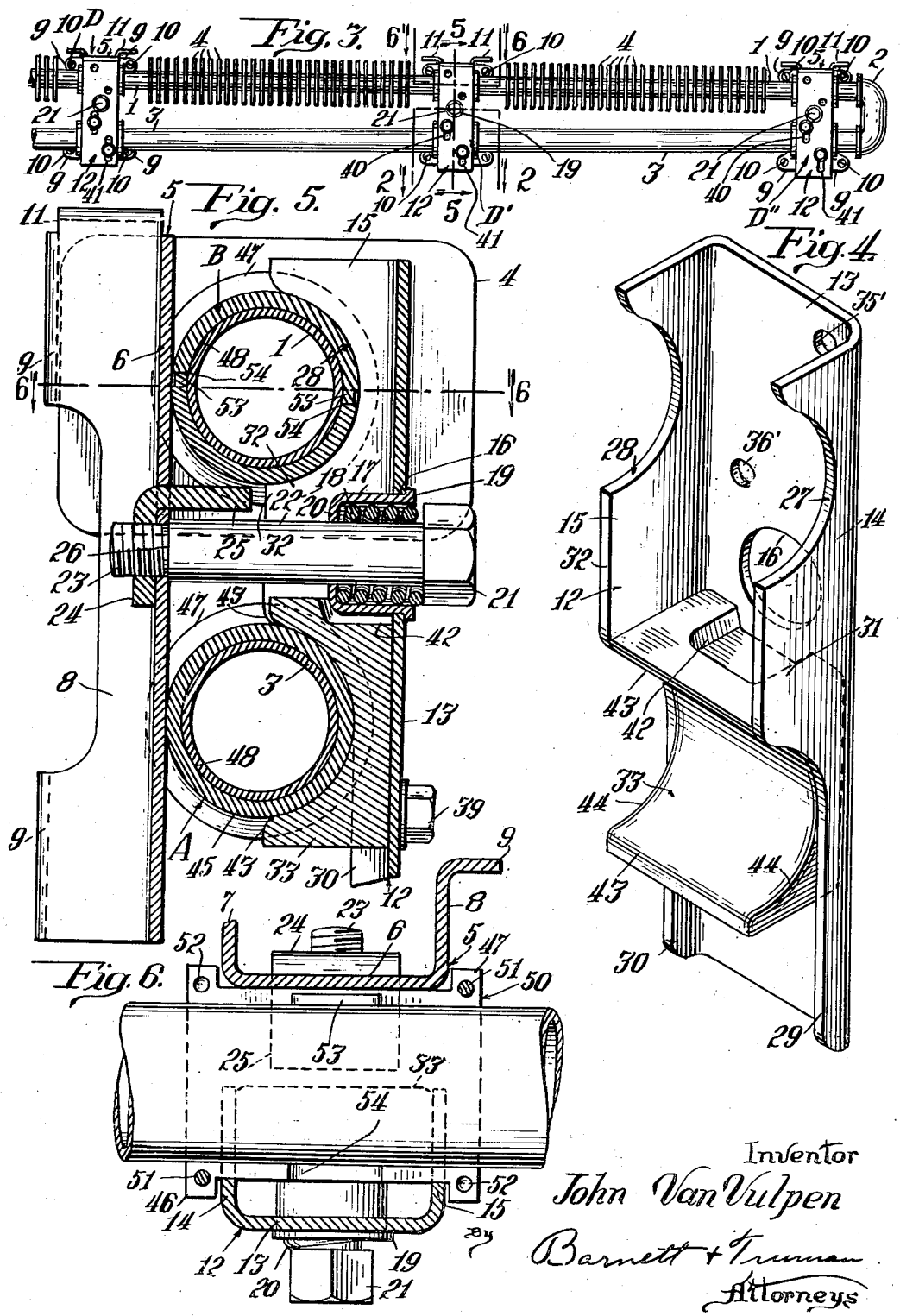

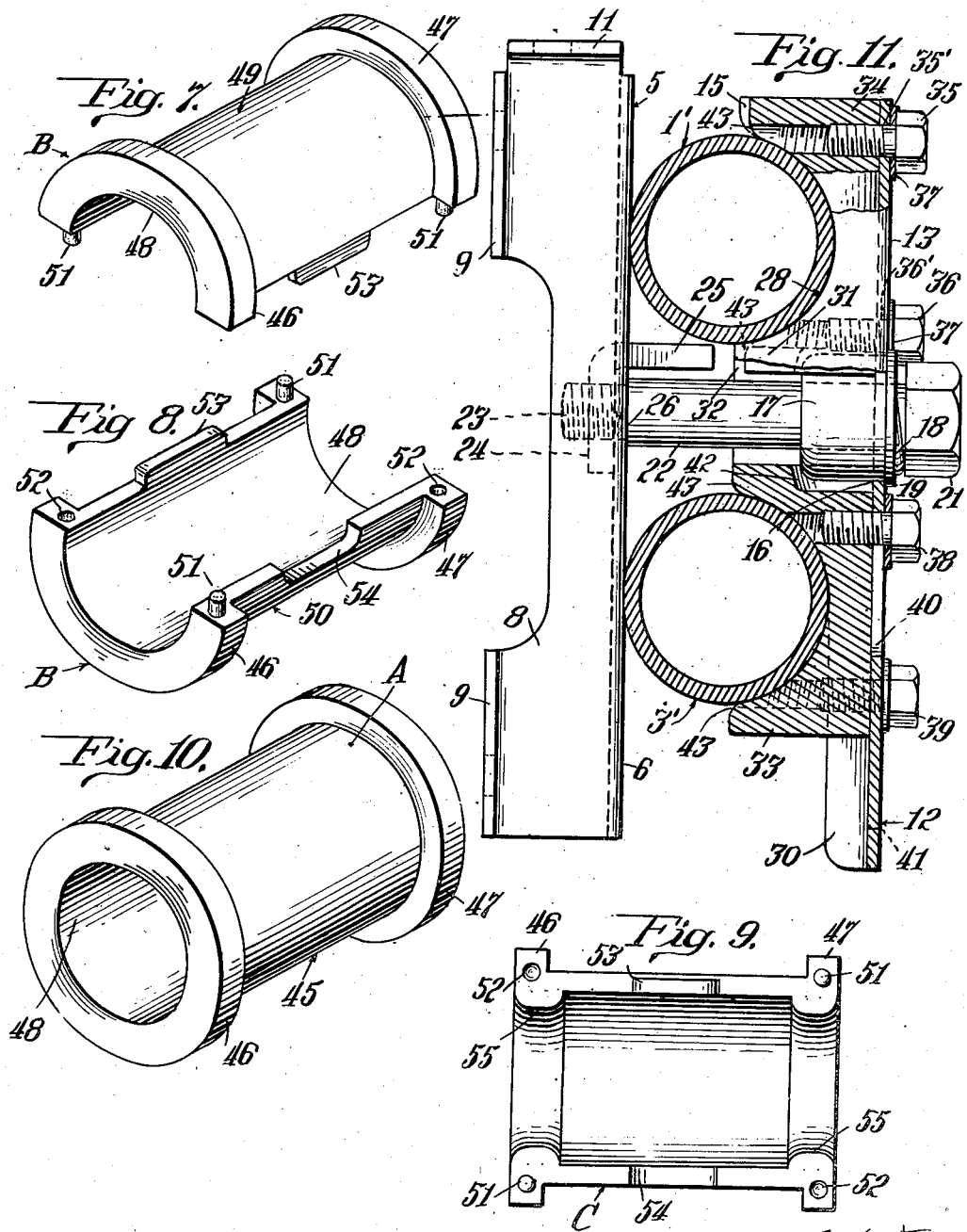

Patented May 30, 1939

2,160,689

UNITED STATES PATENT OFFICE 2,160,689

SUPPORT FOR RADIATING PIPES

John Van Vulpen, Chicago, Ill., assignor to Vapor Car Heating Company, Inc., Chicago, Ill., a corporation of New York Application March 31, 1938, Serial No. 199,078

13 Claims. (Cl. 248—68)

This invention relates to a new and improved pipe-supporting means, more particularly to an improved pipe-holding clamp assembly or bracket adapted to support two or more substantially parallel lengths of piping in such a manner as not to crush the pipes and to reinforce and protect the pipes so engaged by the clamp, and to permit one pipe section to be adjusted within limits toward or from the other pipe section.

While this improved supporting means might be used for various purposes, it is particularly designed for supporting the radiating piping of a steam heating system, especially a railway car heating system. Usually these pipes are not spaced exactly the same distance apart at all points, since one of the pipes may be slightly inclined for drainage purposes. In order to provide a universal clamp adapted for use at any position along the pair of pipes, the bracket is so formed that one of the pipe supports can be adjusted relative to the other. In some modern heating systems of this type the pipes are formed of thin copper tubing provided with a plurality of spaced apart fins to give additional radiating surface. Such piping is not heavy and might be crushed or distorted if the clamping means is unyielding, or is applied directly thereto, and the present invention comprises rigid reinforcing sleeves adapted to be interposed between the supporting bracket and the piping. The clamping means is also yieldable so as to limit the clamping pressure applied to the pipes or sleeves and to permit a small tolerance or variation in the sizes of the pipes and clamping members.

The principal object of this invention is to provide an improved pipe-supporting means such as briefly described hereinabove and disclosed more in detail in the specifications which follow.

Another object is to provide an improved pipe-supporting means in which the spacing between the pipes can be varied.

Another object is to provide a pipe-support which will not crush the pipes engaged and supported thereby.

Another object is to provide improved pipe-holding and reinforcing sleeves, these sleeves being interposed between the pipes and the supporting bracket assembly.

Another object is to provide an improved yieldable clamping means for securing the portions of the bracket assembly about the supported pipes.

Another object is to provide an auxiliary or temporary support for a portion of the piping while the supports are being assembled.

Other objects and advantages of this invention will be more apparent from the following detailed description of certain approved forms of devices constructed and operating according to the principles of this invention.

In the accompanying drawings:

Fig. 1 is a perspective view of one of the supporting assemblies and portions of a pair of pipes supported thereby.

Fig. 2 is a horizontal section through the central portion of the assembly shown in Figs. 1 and 3, the view being taken substantially on the line 2—2 of Fig. 3.

Fig. 3 is an elevation, on a smaller scale, of a portion of a radiating loop illustrating how a plurality of these supporting bracket assemblies are utilized to support the parts of this loop.

Fig. 4 is a rear perspective view of the bracket assembly as used in Fig. 1.

Fig. 5 is a longitudinal vertical section through the assembly of Figs. 1 and 2, the view being taken substantially on the line 5—5 of Figs. 2 and 3.

Fig. 6 is a horizontal section taken substantially on the line 6—6 of Figs. 3 and 5.

Figs. 7 and 8 are, respectively, perspective views of the two half-sections of one of the split holding sleeves.

Fig. 9 is a plan view of one of the sections of a modified form of sleeve adapted to hold a pipe of smaller diameter.

Fig. 10 is a perspective view of a solid, or one-piece, sleeve.

Fig. 11 is a central vertical section, similar to Fig. 5, of a modified supporting assembly particularly adapted to support steel pipes, or pipes with which the supporting sleeves are not required.

Referring first to Figs. 1 and 3, a portion of a railway car radiating system has been shown. Such a system comprises a pair of pipes forming a loop extending from and back to the control valve or source of supply which may be located centrally of or near one end of the space to be heated. This radiating loop comprises an upper pipe 1 extending from the supply valve and connected at one end by fitting 2 with the return pipe 3 leading back to the valve. These pipes, (in the example here shown) are preferably formed of comparatively thin copper tubing to decrease the weight and increase the radiation, and upper pipe 1 is shown as provided with a plurality of spaced apart copper fins 4 to provide extended radiating surface. The lower pipe 3 is primarily a drain pipe although of course heat will also be radiating from this pipe, and if desired this pipe may also be finned. To provide for proper drainage of the condensate formed in the loop the pipes are inclined somewhat. This inclination is small and at any particular point along the length of the loop the pipes may be considered as substantially parallel, but the spacing between the pipes for a long loop may be considerably less (perhaps an inch) at the closed end of the loop than it is at the other end. This loop must be supported at suitable intervals throughout its length and if a universal type of supporting means or bracket is used, provision must be made for this varied spacing between the pipes. The present invention provides for such a universal type of bracket.

The main supporting member of one of the bracket assemblies may be any suitable portion of the car frame structure, although preferably a metallic supporting member 5 is provided adapted to be secured to the car structure. The preferred form of this supporting member 5, as here shown, is of channel form comprising a front plate 6, a pair of rearwardly extending side flanges 7 and 8, and a plurality of ears 9 extending from the rear corner portions of the side flanges 7 and 8 substantially parallel to front wall 6 and provided with openings for receiving screws or bolts 10 by which the supporting member is secured to the car frame structure. Horizontal ears 11 are also provided extending laterally from the tops of side flanges 7 and 8 for attachment to the under surface of a car frame beam. It will be obvious that such supporting ears can be provided on any desired portion of the member according to the frame structure to which it is to be attached.

The main bracket member 12 is preferably in the form of a section of channel metal consisting of a front wall 13 and a pair of rearwardly extending substantially parallel side plates 14 and 15. At a position intermediate the length of bracket 12, the front plate or wall 13 is provided with a rather large circular opening 16 in which is fitted a spring-cup or housing 17 enclosing the compression spring 18. The outer end of cup 17 is provided with an outwardly extending annular flange 19 which seats against the outer face of front plate 13 of the main bracket. Cup 17 is provided at its inner end with an inwardly extending annular flange 20 against which abuts the inner end of spring 18. The other end of the spring abuts against head 21 of the main securing bolt 22 which extends inwardly through the main bracket, spring, and spring cup, and has a reduced threaded inner end portion 23 which engages in an opening in the front wall 6 of supporting member 5. This portion of wall 6 is reinforced by small right-angled reinforcing plate 24, this plate being threaded to receive the end 23 of the bolt. The upper end portion 25 of reinforcing plate 24 extends horizontally outward through wall 6 so as to provide a temporary support for the upper pipe 1 or its reinforcing sleeve, as hereinafter referred to. It will be noted that the shouldered portion 26 of bolt 22 engages the front wall 6 of the main supporting member so as to limit the inward movement of the bolt. It will be understood that by removing the single bolt 22 the entire supporting bracket assembly as hereinafter described may be detached from the main supporting member 5.

The side plates 14 and 15 of the upper portion of the main supporting bracket 12 are cut away to form similar aligned substantially semi-circular recesses 27 and 28 adapted to partially enclose a pipe, or to hold one of the pipe-holding sleeves as hereinafter described. The lower portions of side plates 14 and 15 are also cut away or made narrower as indicated at 29 and 30 so as to receive the lower pipe 3 and permit this pipe to be adjusted vertically. Preferably the intermediate portions of the side plates are made wider as indicated at 31 and 32 so as to extend inwardly between the pipes 1 and 3, so as to additionally strengthen the bracket, although the exact form of the side plates of the main bracket member is immaterial as long as recesses are provided to accommodate the pipe sections and holding sleeves and permit the desired adjustment thereof.

An auxiliary bracket or supporting block 33, preferably in the form of a die casting, has a horizontal length sufficient to fit between the side flanges 14 and 15 of the main bracket with the front face of the block engaging the inner surface of the front wall 13 of the bracket. The rear face of this block 33 is formed with a substantially semi-cylindrical horizontally extending recess adapted to engage and hold either a pipe (Fig. 11) or a suitable reinforcing sleeve mounted about the lower pipe (Figs. 1, 2 and 5).

Referring now for the moment to the simpler form of the invention shown in Fig. 11 in which steel pipes 1' and 3' are to be supported, a second clamp or supporting block 34 is used, this second block or bracket being in all respects the same as the lower clamp 33. Since the steel piping has sufficient strength and rigidity not to require reinforcement to prevent crushing, the pipes are clamped directly within the semi-cylindrical recesses of the supporting blocks and against the front wall 6 of the main supporting member 5. The upper auxiliary bracket 34 is secured in fixed position to the main bracket 12 by means of screw bolts 35 and 36 passed through openings 35' and 36' in the front plate 13 of the main bracket and threaded into suitable openings in block or bracket 34. Preferably lock washers 37 are interposed between the heads of the bolts and the supporting bracket to prevent the bolts from shaking loose. The lower clamping block 33 is similarly held in position by means of screw bolts 38 and 39 passed respectively through vertical slots 40 and 41 formed in the lower portion of front wall 13 of the main bracket 12. It will be apparent that by loosening the bolts 38 and 39 the lower clamp 33 can be adjusted vertically so as to accommodate a variation in the spacing between the upper and lower pipes 1' and 3'. It will be noted that the lower clamp or auxiliary bracket 33 is cut away at 42 in its upper portion to accommodate the spring cup 17 and permit the lower auxiliary bracket to be adjusted closer to the upper bracket 34 thus permitting a closer spacing of the two pipes. Preferably each of the clamping blocks is rounded outwardly at 43, at the ends of the semi-cylindrical recess and also the horizontally extending ends of these recesses are preferably rounded away on a small arc as indicated at 44. This eliminates any sharp edges on the clamping members which might bite into the piping, especially when the pipes expand and contract or move lengthwise through the supporting assembly due to this expansion and contraction. It will be noted that the recesses in the supporting blocks are of somewhat smaller diameter than the recesses 27 and 28 in the main bracket 12 so that the pipes will not engage directly with the side walls of the main bracket.

Still referring to the simpler form of assembly shown in Fig. 11, the supporting clamps or brackets 33 and 34 are first assembled within the main bracket 12, with the upper block 34 in fixed position but with the lower bolts 38 and 39 loosened so that block 33 may be adjusted vertically. The clamping assembly is then put in position over the pipes and secured to the main supporting member 5 by inserting the main securing bolt 22 and threading this bolt into position in the main supporting member 5. The adjustability of the lower block or bracket 33 will permit the spacing of the clamping blocks to be adjusted to the spacing of the pipes at this particular location, and the screws 38 and 39 are then tightened to complete the assembly. There will be sufficient play or clearance between the pipes and the supporting members to allow for the slight inclination of one pipe with respect to the other. As has already been pointed out the pipes are usually at a slight angle to one another to permit drainage, but this inclination is very small at any one position along the pipe loop.

Returning now to the form of the invention shown in Figs. 1 to 10 inclusive, the upper clamping block 34 may be omitted but the lower adjustable block 33 is retained. When thin copper tubing is used for the radiation it is preferable to interpose reinforcing sleeves between the pipes or tubes and the bracket assembly so as to prevent crushing these pipes and at the same time allow for longitudinal sliding movement of the pipes as they expand or contract. These supporting sleeves are indicated at A and B in Figs. 1 and 5. When used with plain tubing, or at the ends of thin tubing where the sleeve can be slipped into place over the end of the pipe section, it is preferable to use a solid or one-piece reinforcing sleeve A (Fig. 10). The sleeve comprises a cylindrical hollow shell 45 having an exterior diameter adapted to fit snugly within the recessed portion of auxiliary clamp 33, or within the recesses 27 and 28 of the main bracket 12. The sleeve is provided with external annular end collars 46 and 47 adapted to engage the external surfaces of side flanges 14 and 15 of the main bracket 12, as well as the sides 7 and 8 of the main supporting member 5, and thus limit longitudinal movement of the sleeve. The sleeve has an internal bore 48 of proper diameter to receive the radiating pipe but permits this pipe to expand and move longitudinally through the sleeve as the pipe expands or contracts due to temperature changes. When the pipe or tube is provided with fins 4 so that the sleeve cannot be slipped into place over the end of the pipe section, a split sleeve B is used (see Figs. 7 and 8). This sleeve comprises two similar half sections 49 and 50 and may be considered as split longitudinally by a plane containing the longitudinal central axis of the sleeve. At two corners of the sleeve section (preferably the diagonal opposite corners) where the section is reinforced by collars 46 and 47, it is provided with outstanding dowels 51 which are adapted to engage in holes or openings 52 formed in the opposing corner portions of the other sections. These dowels will hold the two sections in proper alignment when brought together about the pipe. One side of the cylindrical shell 45 is extended at a position intermediate its length to form a rather long lug 53 adapted to lie within a corresponding recess 54 in the other section. When the enclosed pipe moves longitudinally through the sleeve as it expands or contracts, there is a tendency to shift the sleeve lengthwise, and the lugs 53 prevent relative longitudinal movement of the two sleeve sections which might shear off the dowels 51.

In the event that the pipe to be supported is of a smaller diameter an alternative form of sleeve C may be used (see Fig. 9). This sleeve may be either one-piece like sleeve A or split like sleeve B and is in all respects the same as either of these sleeves except for the fact that it is provided with inwardly extending annular collars 55 adjacent its ends to engage and support the pipe of smaller diameter.

It will be apparent that by extending the length of the main bracket member 12 and providing an auxiliary bracket or clamp such as 33, a support for a third pipe could be provided.

It will be understood that all of the supporting assemblies (indicated for example at D, D' and D'' in Fig. 3) may be of identical construction and positioned at convenient or necessary points throughout the length of the pipe loop or wherever suitable supporting members 5 are provided.

When using the form of supporting assembly shown in Figs. 1 to 10 inclusive, the proper reinforcing sleeves are first selected and applied to the pipes either by slipping a solid sleeve over the end of the pipe section or by assembling the two half sections of a split sleeve in an obvious manner. The remainder of the supporting assembly is then applied in the same manner as already described. It will be understood that the reinforcing sleeves are held in place between the bracket members and the supporting member 5 in the same way that the pipes are held in the assembly shown in Fig. 11. The sleeves are sufficiently strong and rigid to prevent crushing of the weaker copper tubing supported therein.

It will be noted that the upper horizontal outwardly extending end portion 25 of the reinforcing plate or bracket 24 of the main supporting member extends inwardly beneath the upper reinforcing sleeve B or pipe 1'. This member 25 will serve as a temporary support for the upper pipe of the loop when the parts are being assembled, or might serve as a partial support for this upper pipe in the event that there should be any play or sag in the assembly.

It will be noted that the pipes or sleeves are not positively or unyieldably clamped against the main supporting member, but that the clamping force is limited by the compression spring 18 so that a certain amount of expansion is permitted. Also any play or looseness in the parts will be automatically taken up by the expansion of this spring. This spring also permits a certain tolerance or variation in the sizes of the assembled bracket members and pipes.

I claim:

1. A supporting means for radiating pipes comprising a main supporting member, a main bracket member adapted to be secured to the supporting member in spaced relation thereto so as to support a pair of pipes between the bracket and supporting member, one portion of the bracket being recessed to partially enclose one side of a pipe and hold the pipe against the supporting member, and an auxiliary bracket also recessed to partially enclose a second pipe and clamp it against the supporting member, means for adjustably securing the auxiliary bracket to the main bracket for movement toward or from the first mentioned recessed portion to permit variation in the spacing between the pipes, and means for securing the main bracket to the supporting member in pipe-clamping position.

2. A supporting means for radiating pipes comprising a main supporting member, a main bracket member adapted to be secured to the supporting member in spaced relation thereto so as to support a pair of pipes between the bracket and supporting member, one portion of the bracket being recessed to partially enclose one side of a pipe and hold the pipe against the supporting member, and an auxiliary bracket also recessed to partially enclose a second pipe and clamp it against the supporting member, means for adjustably securing the auxiliary bracket to the main bracket for movement toward or from the first mentioned recessed portion to permit variation in the spacing between the pipes, and means for yieldably securing the main bracket to the supporting member in pipe-clamping position.

3. A supporting means for radiating pipes comprising a main supporting member, a main bracket member adapted to be secured to the supporting member in spaced relation thereto so as to support a pair of pipes between the bracket and supporting member, one portion of the bracket being recessed to partially enclose one side of a pipe and hold the pipe against the supporting member, and an auxiliary bracket also recessed to partially enclose a second pipe and clamp it against the supporting member, means for adjustably securing the auxiliary bracket to the main bracket for movement toward or from the first mentioned recessed portion to permit variation in the spacing between the pipes, and means for securing the intermediate portion of the main bracket to the supporting member in pipe-clamping position comprising a bolt passed through an opening in the bracket and removably anchored at its inner end in the supporting member, and a spring interposed between the head of the bolt and the bracket.

4. A supporting means for radiating pipes comprising a main supporting member, a main bracket of channel form having a front plate and substantially parallel rearwardly extending side plates, the side plates of one end portion of the bracket being recessed to partially enclose and support a pipe, an auxiliary bracket member recessed to partially enclose and support a second pipe, means for mounting said auxiliary bracket between the side plates of the other end portion of the main bracket for adjustment toward or from the first mentioned recessed pipe-supporting portion, and means for securing the main bracket to the supporting member in pipe-clamping position.

5. A supporting means for radiating pipes comprising a main supporting member, a main bracket of channel form having a front plate and substantially parallel rearwardly extending side plates, the side plates of one end portion of the bracket being recessed to partially enclose and support a pipe, an auxiliary bracket member recessed to partially enclose and support a second pipe, means for mounting said auxiliary bracket between the side plates of the other end portion of the main bracket for adjustment toward or from the first mentioned recessed pipe-supporting portion, and means for securing the main bracket to the supporting member in pipe-clamping position, said means comprising longitudinally extending slots in the front plate of the main bracket, and screws passed through these slots and engaging the auxiliary bracket, and means for securing the main bracket to the supporting member in pipe-clamping position.

6. A supporting means for radiating pipes comprising a main supporting member, a main bracket of channel form having a front plate and substantially parallel rearwardly extending side plates, the side plates of one end portion of the bracket being recessed to partially enclose and support a pipe, an auxiliary bracket member recessed to partially enclose and support a second pipe, means for mounting said auxiliary bracket between the side plates of the other end portion of the main bracket for adjustment toward or from the first mentioned recessed pipe-supporting portion, and means for yieldably securing the intermediate portion of the main bracket to the supporting member in pipe-clamping position.

7. A supporting means for radiating pipes comprising a main supporting member, a main bracket of channel form having a front plate and substantially parallel rearwardly extending side plates, the side plates of one end portion of the bracket being recessed to partially enclose and support a pipe, an auxiliary bracket member recessed to partially enclose and support a second pipe, means for mounting said auxiliary bracket between the side plates of the other end portion of the main bracket for adjustment toward or from the first mentioned recessed pipe-supporting portion, means for securing the intermediate portion of the main bracket to the supporting member in pipe-clamping position comprising a bolt passed through an opening in the front plate of the main bracket and removably anchored at its inner end in the supporting member, a spring-cup secured in the bracket-opening, and a spring housed in the cup and interposed between the head of the bolt and the inner end of the cup.

8. A supporting means for radiating pipes comprising a main supporting member, a bracket member adapted to be secured to the supporting member in spaced relation thereto so as to support a pair of pipes between the bracket and supporting member, a pair of similarly auxiliary bracket member mounted on the main bracket, means for adjustably mounting one of the auxiliary brackets on the main bracket for movement toward or from the other auxiliary bracket, each auxiliary bracket having a substantially semi-cylindrical recess therein to partially enclose and support a pipe, and means for securing the main bracket to the supporting member in pipe-clamping position.

9. A supporting means for radiating pipes comprising a main supporting member, a bracket member adapted to be secured to the supporting member in spaced relation thereto so as to support a pair of pipes between the bracket and supporting member, a pair of similar auxiliary bracket members mounted on the main bracket, means for adjustably mounting one of the auxiliary brackets on the main bracket for movement toward or from the other auxiliary bracket, each auxiliary bracket having a substantially semi-cylindrical recess therein to partially enclose and support a pipe, and means for yieldably securing the intermediate portion of the main bracket to the supporting member in pipe-clamping position.

10. A supporting means for radiating pipes comprising a main supporting member, a main bracket member of channel form having a front plate and substantially parallel rearwardly extending side plates, a pair of similar auxiliary brackets mounted between the side plates in opposite end portions of the main bracket and secured to the front plate, there being longitudinally extending slots in one end portion of the front plate, and screws extending through these slots and engaging the adjacent auxiliary bracket to secure this bracket to the main bracket in adjusted position relative to the other auxiliary bracket, each auxiliary bracket having a substantially semi-cylindrical recess therein to partially enclose and support a pipe, and means for yieldably securing the intermediate portion of the main bracket to the supporting member in pipe-clamping position.

11. A supporting bracket for thin metal radiating pipes comprising a main supporting member, a bracket member adapted to be secured to the supporting member in spaced relation thereto so as to support a pair of pipes between the bracket and supporting member, one portion of the bracket being recessed to partially enclose one side of a pipe, and an auxiliary bracket also recessed to partially enclose a second pipe, means for adjustably securing the auxiliary bracket to the main bracket for movement toward or from the first mentioned recess portion to permit variation in the spacing between the pipes, a pair of pipe holding and reinforcing sleeves adapted to enclose the respective pipes and to be received in the recesses and clamped between the brackets and the supporting member, and means for securing the main bracket to the supporting member in sleeve clamping position.

12. A supporting bracket for thin metal radiating pipes comprising a main supporting member, a bracket member adapted to be secured to the supporting member in spaced relation thereto so as to support a pair of pipes between the bracket and supporting member, one portion of the bracket being recessed to partially enclose one side of a pipe, and an auxiliary bracket also recessed to partially enclose a second pipe, means for adjustably securing the auxiliary bracket to the main bracket for movement toward or from the first mentioned recessed portion to permit variation in the spacing between the pipes, a pair of pipe holding and reinforcing sleeves adapted to enclose the respective pipes and to be received in the recesses and clamped between the brackets and the supporting member, and means for yieldably securing the main bracket to the supporting member in sleeve clamping position.

13. A supporting bracket for thin metal radiating pipes comprising a main supporting member, a bracket member adapted to be secured to the supporting member in spaced relation thereto so as to support a pair of pipes between the bracket and supporting member, one portion of the bracket being recessed to partially enclose one side of a pipe, and an auxiliary bracket also recessed to partially enclose a second pipe, means for adjustably securing the auxiliary bracket to the main bracket for movement toward or from the first mentioned recessed portion to permit variation in the spacing between the pipes, a pair of pipe holding and reinforcing sleeves adapted to enclose the respective pipes and to be received in the recesses and clamped between the brackets and the supporting member, one of the radiating pipes being provided with radiating fins, and the sleeve enclosing this pipe being longitudinally split and comprising two similar half-sections, and interengaging means on the sections for holding them in alignment, and means for securing the main bracket to the supporting member in sleeve clamping position.

JOHN VAN VULPEN.